US006735591B2

(12) United States Patent
Khan

(10) Patent No.: US 6,735,591 B2
(45) Date of Patent: May 11, 2004

(54) UNIVERSAL INFORMATION WAREHOUSE SYSTEM AND METHOD

(76) Inventor: Joseph M. Khan, 42 Orchard Hill Rd., Katonah, NY (US) 10536

( * ) Notice: Subject to any disclaimer, the term of this patent is extended or adjusted under 35 U.S.C. 154(b) by 0 days.

(21) Appl. No.: 09/237,434

(22) Filed: Jan. 26, 1999

(65) Prior Publication Data

US 2002/0184210 A1 Dec. 5, 2002

(51) Int. Cl.$^7$ ................................................. G06F 7/00
(52) U.S. Cl. ........................... 707/101; 707/102; 707/6; 707/4; 707/104.1
(58) Field of Search ................................. 707/1–4, 100, 707/101, 104, 103, 102; 715/4; 345/335

(56) References Cited

U.S. PATENT DOCUMENTS

| | | | | |
|---|---|---|---|---|
| 5,191,522 A | * | 3/1993 | Bosco et al. .................... | 705/4 |
| 5,257,185 A | * | 10/1993 | Farley et al. ................ | 707/100 |
| 5,550,971 A | * | 8/1996 | Brunner et al. ................. | 707/3 |
| 5,604,899 A | * | 2/1997 | Doktor ........................... | 707/3 |
| 5,617,567 A | * | 4/1997 | Doktor ........................... | 707/2 |
| 5,627,979 A | * | 5/1997 | Chang et al. ............... | 345/335 |
| 5,713,014 A | * | 1/1998 | Durflinger et al. ............. | 707/4 |
| 5,978,811 A | * | 11/1999 | Smiley ....................... | 707/103 |
| 6,061,515 A | * | 5/2000 | Chang et al. ................... | 717/2 |
| 6,061,689 A | * | 5/2000 | Change et al. .......... | 707/103 R |
| 6,073,138 A | * | 6/2000 | De L'Etraz et al. ........ | 707/104 |
| 6,108,664 A | * | 8/2000 | Nori et al. ............... | 707/103 R |
| 6,112,209 A | * | 8/2000 | Gusack ........................ | 707/101 |
| 6,161,103 A | * | 12/2000 | Rauer et al. .................... | 707/4 |
| 6,167,405 A | * | 12/2000 | Rosensteel, Jr. et al. .... | 707/102 |
| 6,202,070 B1 | * | 3/2001 | Nguyen et al. ............. | 707/104 |
| 6,208,992 B1 | * | 3/2001 | Bruckner ..................... | 707/100 |
| 6,334,125 B1 | * | 12/2001 | Johnson et al. ................. | 707/3 |

* cited by examiner

*Primary Examiner*—Shahid Al Alam
*Assistant Examiner*—Anh Ly
(74) *Attorney, Agent, or Firm*—Darby & Darby

(57) ABSTRACT

The present invention, the Information Warehouse, is a method and apparatus for gathering, storing and organizing information related to all the aspects of any organization, using a novel classification system. The Information warehouse contains one or more information bases. Each Information base is a specially configured database. Each information base consists of thirteen tables containing specially defined and structured records. Seven tables contain information elements classified into seven categories. Three tables contain the information needed by the Relationships manager. Three tables contain information needed by the Transactions managers. The present invention allows for users to input information about the constituents of an organization and their activities into the information base. This populating of the information base can be done in two ways. Manually by direct input via data entry interfaces of this invention and via data feeds or input files converted by the conversion modules of this invention. The present invention also allows users to retrieve information from the information base using search techniques.

60 Claims, 11 Drawing Sheets

Table 1: LOCATIONS_TABLE

| ID | Name | Description | LinKID | Bldg(Note) | ZIP(Identifier) |
|---|---|---|---|---|---|
| 1 | USA | United States | 1 | | |
| 2 | CAN | Canada | 2 | | |
| 3 | JPN | Japan | 3 | | |
| 4 | NY | New York | 1 | | |
| 5 | CT | Connecticut | 1 | | |
| 6 | NY City | New York City | 4 | | |
| 7 | Albany | City of Albany | 4 | | |
| 8 | CA | California | 1 | | |
| 9 | New Haven | City of New Haven | 5 | | |
| 10 | Katonah | Town of Katonah | 4 | | |
| 11 | Broadway | Broadway | 6 | | |
| 12 | 5$^{th}$ Avenue | Fifth Avenue | 6 | | |
| 13 | Appt 1A | 11$^{th}$ Floor | 11 | 71 | 10006 |
| 14 | Chase Plaza | Chase Manhattan | 6 | | |
| 15 | MIS | 37$^{th}$ Floor | 14 | 1 | -10005 |
| 16 | Third Ave. | Third Avenue, NY | 6 | | |
| 17 | D&D NY | Darby in NY | 16 | 805 | 10022-7513 |
| 18 | Wilshire Blvd | Wilshire Blvd, LA | 8 | | |
| 19 | D&D LA | Darby in LA | 18 | 707 | 90017-3514 |

Table 2: MATERIALS_TABLE

| ID | Name | Description | LinKID |
|---|---|---|---|
| 1 | DIR | Default Membership | 1 |
| 2 | TV | Television Set | 2 |
| 3 | SAT | Satellite Dish | 3 |
| 4 | PC | Personal Computer | 4 |
| 5 | INTERNET | Internet Access | 5 |

Table 3: INDIVIDUALS_TABLE

| ID | Name | Description | LinKID |
|---|---|---|---|
| 1 | Mitch | Martin | 1 |
| 2 | Eric | Eastman | 2 |
| 3 | Joe | Johnson | 3 |
| 4 | Lauris | Johnson | 3 |
| 5 | Cyrah | Johnson | 3 |
| 6 | Nadia | Johnson | 3 |
| 7 | Alec | Johnson | 3 |

| INDIVIDUALS | MATERIALS | LOCATIONS | ACTIVITIES | ORGANIZATIONS | RELATIONSHIP NAMES | ATTRIBUTE NAMES |
|---|---|---|---|---|---|---|
| RID | RID | RID | RID | RID | RID | RID |
| ID | ID | ID | ID | ID | ID | ID |
| NAME | NAME | NAME | NAME | NAME | NAME | NAME |
| DESCRIPTION | DESCRIPTION | DESCRIPTION | DESCRIPTION | DESCRIPTION | DESCRIPTION | DESCRIPTION |
| LinkID | LinkID | LinkID | LinkID | LinkID | | |
| DOB | DOB | DOB | DOB | DOB | | PER_UOM |
| POB | POB | POB | POB | POB | | |
| ORIGINATOR | ORIGINATOR | ORIGINATOR | ORIGINATOR | ORIGINATOR | RELATIVES_ | ATTRIBUTE_ |
| BUILDER | BUILDER | BUILDER | BUILDER | BUILDER | TABLE_ID | TYPE |
| UPDATED BY | UPDATED BY | UPDATED BY | UPDATED BY | UPDATED BY | UPDATED BY | UPDATED BY |
| AUTHORIZED BY | AUTHORIZED BY | AUTHORIZED BY | AUTHORIZED BY | AUTHORIZED BY | AUTHORIZED BY | AUTHORIZED BY |
| IDENTIFIER | IDENTIFIER | IDENTIFIER | IDENTIFIER | IDENTIFIER | | |
| NOTE | NOTE | NOTE | NOTE | NOTE | | |

Figure 4

| RELATIONSHIPS | RELATIVES DATA | VALUES |
|---|---|---|
| RID<br>ID<br><br>RELATIONSHIP_TYPE<br>RELATEE_ID<br>RELATEE_TYPE | RID<br>ID<br><br>RELATIONSHIP_ID<br>RELATIVE_ID | RID<br>ID<br><br>ATTRIBUTE_<br>NAME_ID<br><br>RELATIVE_ID<br>VALUE<br>VALUE_TYPE |

Figure 5

| RELATIONSHIPS LOG | TRANSACTIONS TABLE | TRANSACTION ARCHIVE |
|---|---|---|
| RID<br>ID<br><br>(Fields for historical data logs) | RID<br>ID<br><br>RELATIVE<br>RELATIONSHIP<br>FROM_RELATEE<br>TO_RELATEE<br>VALUE | RID<br>ID<br><br>(Fields for historical data archive) |

Figure 6

Table 1: LOCATIONS_TABLE

| ID | Name | Description | LinKID | Bldg(Note) | ZIP(Identifier) |
|---|---|---|---|---|---|
| 1 | USA | United States | 1 | | |
| 2 | CAN | Canada | 2 | | |
| 3 | JPN | Japan | 3 | | |
| 4 | NY | New York | 1 | | |
| 5 | CT | Connecticut | 1 | | |
| 6 | NY City | New York City | 4 | | |
| 7 | Albany | City of Albany | 4 | | |
| 8 | CA | California | 1 | | |
| 9 | New Haven | City of New Haven | 5 | | |
| 10 | Katonah | Town of Katonah | 4 | | |
| 11 | Broadway | Broadway | 6 | | |
| 12 | 5$^{th}$ Avenue | Fifth Avenue | 6 | | |
| 13 | Appt 1A | 11$^{th}$ Floor | 11 | 71 | 10006 |
| 14 | Chase Plaza | Chase Manhattan | 6 | | |
| 15 | MIS | 37$^{th}$ Floor | 14 | 1 | -10005 |
| 16 | Third Ave. | Third Avenue, NY | 6 | | |
| 17 | D&D NY | Darby in NY | 16 | 805 | 10022-7513 |
| 18 | Wilshire Blvd | Wilshire Blvd, LA | 8 | | |
| 19 | D&D LA | Darby in LA | 18 | 707 | 90017-3514 |

Table 2: MATERIALS_TABLE

| ID | Name | Description | LinKID |
|---|---|---|---|
| 1 | DIR | Default Membership | 1 |
| 2 | TV | Television Set | 2 |
| 3 | SAT | Satellite Dish | 3 |
| 4 | PC | Personal Computer | 4 |
| 5 | INTERNET | Internet Access | 5 |

Table 3: INDIVIDUALS_TABLE

| ID | Name | Description | LinKID |
|---|---|---|---|
| 1 | Mitch | Martin | 1 |
| 2 | Eric | Eastman | 2 |
| 3 | Joe | Johnson | 3 |
| 4 | Lauris | Johnson | 3 |
| 5 | Cyrah | Johnson | 3 |
| 6 | Nadia | Johnson | 3 |
| 7 | Alec | Johnson | 3 |

Figure 7a

Table 4: ACTIVITIES_TABLE

| ID | Name | Description | LinKID |
|---|---|---|---|
| 1 | Law | Practice Law | 1 |
| 2 | SWC | SW Consulting | 2 |
| 3 | Restaurants | Run Restaurant Business | 3 |

Table 5: ORGANIZATIONS_TABLE

| ID | Name | Description | LinKID |
|---|---|---|---|
| 1 | Darby | Darby & Darby, P.C. | 1 |
| 2 | KIS | Key Information Systems, Inc. | 2 |
| 3 | KC | Kisnet Corporation, Inc. | 2 |
| 4 | LLB | EL El & B Lawyers, Inc. | 4 |

Table 6: ATTRIBUTE_NAMES_TABLE

| ID | Name | Description | LinKID |
|---|---|---|---|
| 1 | Tel | Telephone Main Switch Board | 1 |
| 2 | Fax | Main Fax Number | 2 |
| 3 | E-mail | E-mail Address | 3 |
| 4 | MI | Middle Initial / Name | 4 |
| 5 | Population | Number of Occupants | 5 |
| 6 | Expiry | Date of Termination | 6 |
| 7 | Elevation | Elevation above sea Level | 7 |
| 8 | Open W/E | Business is Open on weekends | 8 |

Table 7: RELATIONSHIP_NAMES_TABLE

| ID | Name | Description | Relative_Table_ID |
|---|---|---|---|
| 1 | Addresses | Addresses of the subject(relatee) | 1 |
| 2 | Occupation | Profession of the subject | 2 |
| 3 | Residents | Those living at the subject location | 3 |
| 4 | Employee | Those employed by the subject | 3 |
| 5 | Locations | Addresses of the subject | 1 |
| 6 | People | Individuals associated with subject | 3 |
| 7 | Products | Things for sale by subject | 2 |
| 8 | Employer | Organizations employing subject | 5 |
| 9 | Working in | Location of employment of subject | 3 |
| 10 | Based in | Business based at the subject location | 5 |

Figure 7b

Table 8: RELATIONSHIPS_TABLE

| ID | RELATIONSHIP TYPE | RELATEE TYPE | RELATEE ID | {Explanation} |
|---|---|---|---|---|
| 1 | 4 | 5 | 2 | Employees of Organization KIS |
| 2 | 4 | 5 | 1 | Employees of Organization DARBY |
| 3 | 2 | 4 | 1 | Occupation is the Activity of LAW |
| 4 | 2 | 4 | 2 | Occupation is the Activity of SW C |
| 5 | 9 | 1 | 6 | Working in the Location NY City |
| 6 | 3 | 1 | 4 | Residents in the Location of NY City |
| 7 | 10 | 1 | 4 | Based in the Location of NY City |
| 8 | 6 | 2 | 1 | People in the Thing called DIR |

Figure 7c-1

Table 9: RELATIVES_DATA_TABLE

| ID | Relationship Type | Relatee Type | {Explanation} |
|---|---|---|---|
| 1 | 2 | 1 | Employees of Organization DARBY, Mitch --- |
| 2 | 2 | 2 | Employees of Organization DARBY, Eric --- |
| 3 | 1 | 3 | Employees of Organization KIS, Joe---... |
| 4 | 5 | 3 | Working in the Location NY City, Joe ---... |
| 5 | 5 | 2 | Working in the Location NY City, Mitch---... |
| 6 | 5 | 1 | Working in the Location NY City, Eric---... |
| 7 | 7 | 1 | Based in the Location of NY City, Darby---... |
| 8 | 7 | 2 | Based in the Location of NY City, KIS---... |
| 9 | 7 | 3 | Based in the Location of NY City,KC---... |
| 10 | 7 | 4 | Based in the Location of NY City, LLB---... |
| 11 | 8 | 1 | People in the Thing called DIR, Mitch ---... |
| 12 | 8 | 2 | People in the Thing called DIR, xxxxx ---... |
| 13 | 8 | 3 | People in the Thing called DIR, xxxxx ---... |
| 14 | 8 | 4 | People in the Thing called DIR, xxxxx ---... |
| 15 | 8 | 5 | People in the Thing called DIR, xxxxx ---... |
| 16 | 8 | 6 | People in the Thing called DIR, xxxxx ---... |
| 17 | 8 | 7 | People in the Thing called DIR, xxxxx ---... |

Table 10: VALUES_TABLE

| ID | ATTRIB_NAME ID | RELATIVE ID | VALUE | VALUE TYPE | |
|---|---|---|---|---|---|
| 1 | 3 | 11 | mm@abc.com | text | {attribute} |
| 2 | 3 | 1 | mitch@work.com | text | {relational value} |
| 3 | 8 | 9 | Y | Y/N | {relational value} |

Figure 7c-2

UNIVERSAL INFORMATION WAREHOUSE SYSTEM AND METHOD

TECHNICAL FIELD

This invention is related to a method and apparatus for facilitating the management of information related to all aspects of a particular organizational structure. More particularly, this invention relates to a database system with a particular classification framework which is adaptable to a wide variety of organizational structures.

BACKGROUND OF THE INVENTION

There are a wide variety of database structures which are available for collecting, storing, organizing, and distributing information related to the operation of an organization. Conventional systems classify information by storing it in various predefined categorizes. While the pre-definitions are often optimized for a particular application, they also make the system inflexible and limit the amount and scope of information which can be stored, especially when the environmental structure is modified from that used as a model for the pre-definitions. Often, separate database systems are used for different applications within the same organization, such as payroll and inventory. It is useful to be able to cross-reference information from these disparate database systems. However, processing the stored data and information is often complicated due to the use of different data formats and protocols.

In addition, while conventional systems can be customized, the individual database management systems for each application or module require the majority of the development resources for each customized function. Thus, the design of a conventional system can require a significant investment of time, manpower and capital.

Further, an underlying assumption of conventional information management systems is that it is the discrete elements of information which are of primary value. While many methods are available for relating one piece of information stored in a system to another, such as relating the name of an employee to a particular department and project, conventional systems fail to provide adequate mechanisms for providing value to the relationship itself, separate from the value of the actual related elements.

Accordingly, it is an object of the present invention to provide an information database framework which is readily adaptable for storing and organizing information related to all aspects of an organization.

It is another object of the present invention to provide a database framework which standardizes the gathering, storing, and organizing of information for an organization.

SUMMARY OF THE INVENTION

These and other objects are achieved through the use of an Information Warehouse which is structured, populated, and accessed according to the present invention. The information warehouse contains one or more information bases. Each information base is divided into three major areas: a set of informational database tables for storing informational elements, a set of relational tables for storing the relationships between various informational elements and values attributed to those relationships, and a set of transactional tables for storing historical data. Any type of data and relationship between various data elements can be described as a combination of one or more of an element of information, a relationship and value, and a transaction. Thus, a database framework according to the invention can be used to store all aspects of an organization.

A particular advantage to the present database structure is that the relationships between informational elements are stored separately from the elements themselves. This allows particular relationship to be given a value which is separate from the particular value of the related data. In addition, all relationships pertaining to an individual piece of data are linked in a single database, regardless of where the relationship originated or when the information was entered into the database. This allows data and data relationships to be found, gathered, and utilized in an efficient manner. It also provides for efficient access to stored data using relationships which may not have originally been considered important when the data was originally entered because the entire web of relationships is available and can be traversed as needed.

An additional aspect of the present invention is a method for building and maintaining the interaction between the informational tables through the use of relational tables. Every item of data stored in the warehouse has at least one relationship associated with it. According to the invention, values and attributes for given data items and data item relationship are not associated directly with a given data item, but are indirectly associated through the given relationship. By storing values and attributes with reference to a given relationship additional dimensions of flexibility are added the information warehouse which is not present in analogous conventional database systems.

According to a preferred embodiment of the invention, the set of informational database tables is configured as a set of tables, each of which represents a particular type of data element which is included in the set of typical organizational information. By segregating informational elements in this manner, an informational table can be optimized to contain only the data necessary to fully catagorize the particular data element type, thus eliminating unnecessary redundancy between tables. In a particular implementation, seven informational tables are provided: (1) Locations, (2) Materials, (3) Individuals, (4) Activities or Projects, (5) Organizations, (6) Relationships, and (7) Attributes. The first five tables are used to store actual informational or data elements, such as places, things, people, etc., and are sufficient to represent any informational element which may need to be stored in the information warehouse. The sixth and seventh tables are used to store conceptual information defining the types of relationships that can exist between various informational elements and the types of attributes which can be associated with the various relationships. Three relational tables are provided to store the relationships and values attributed to those relationships. Finally, a set of transactional tables can be provided to track changes to the informational and relational tables, transfers of values from one subject to another, and to maintain a historical archive of transactions which are no longer relevant to current activities.

BRIEF DESCRIPTION OF THE DRAWINGS

The foregoing and. other features of the present invention will be more readily apparent from the following detailed description and drawings of illustrative embodiments of the invention in-which:

FIG. 4 is a chart showing a preferred set of field names for the Informational tables of FIG. 3 when implemented using a relational database environment;

FIG. 5 is a chart showing a preferred set of field names for the relational tables of FIG. 3 when implemented using a relational database environment;

FIG. 6 is a chart showing a preferred set of field names for the transactional tables of FIG. 3 when implemented using a relational database environment;

FIGS. 7a–7c (including FIG. 7c–1 and FIG. 7c–2) are partially populated samples of the tables shown in FIGS. 4–5.

DETAILED DESCRIPTION OF THE PREFERRED EMBODIMENTS

Figure 1:
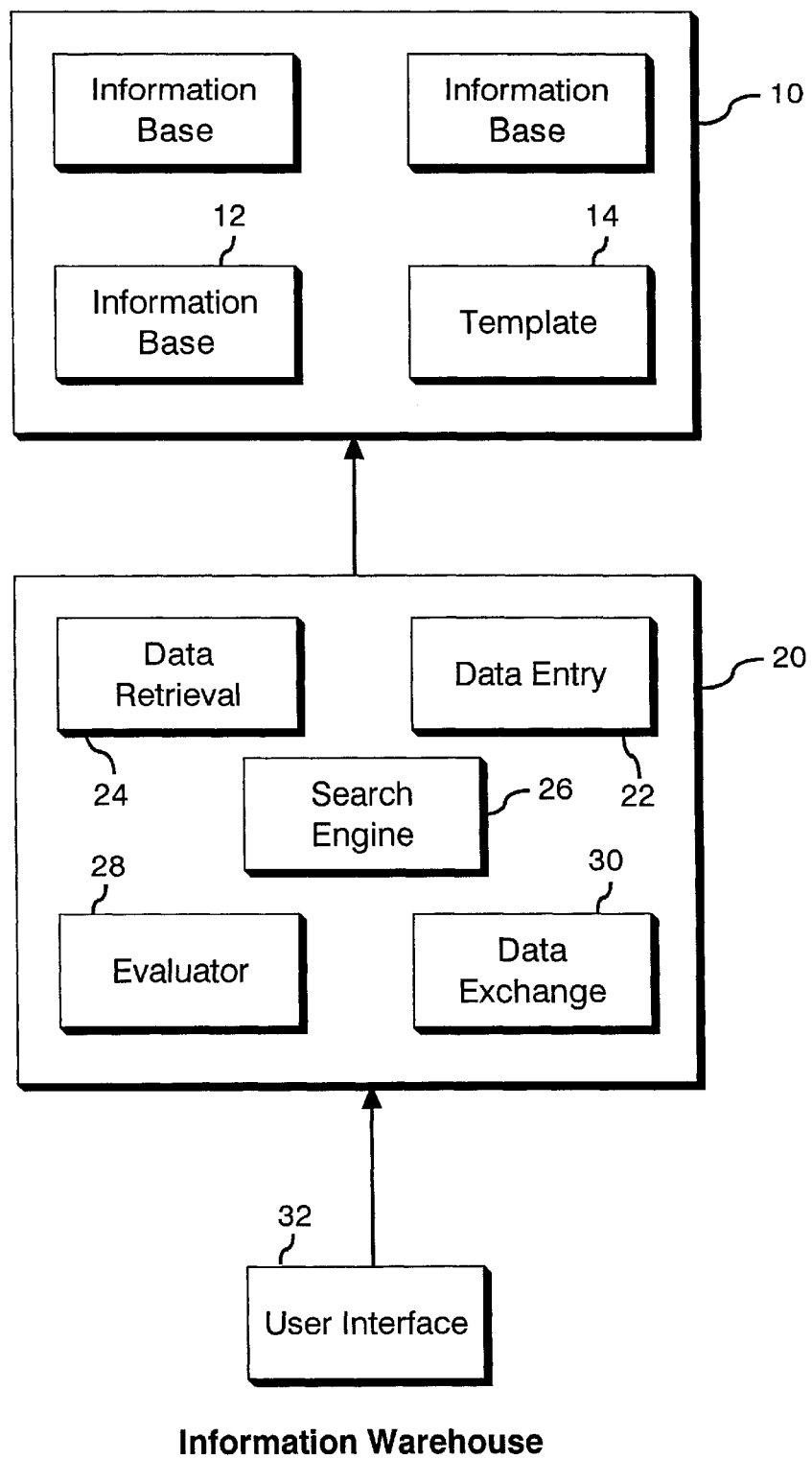
FIG. 1 is an illustration of an information warehouse environment.

Turning to FIG. 1, there is shown an illustration of an information warehouse 10 which comprises one or more information bases 12 for storing information. In an organizations which is made up of sub-organizations, each sub-organization can have its own Information base which is treated as an element of the Information base for higher-levels in the organization. For example, a Global information warehouse may include several enterprise-level information warehouses, each of which may include more narrowly focused warehouses.

The information bases 12 exist as structured databases, described below, which are stored on a computer accessible medium, such as a disk drive. Also present in an information warehouse 10 can be an information base template 14 which contains the structural and logical framework of an information base 12 but which has not yet been configured for a particular application. Although the warehouse 10 is illustrated as a single element, the information bases 12 may be stored on the same device or may be stored on separate devices which are interconnected through a conventional network system, such as a LAN, Intranet, or the Internet.

Also illustrated in FIG. 1 is an Information Warehouse computer program 20 for interacting with the information warehouse 10. The program 20 contains a number of separate modules, including a data entry module 22, a data retrieval module 24, a search engine 26, an evaluator module 28, and a data exchange module 30. The modules are executed on a computer which is connected to the information warehouse directly, or through a remote connection, and are accessed through a conventional user interface 32. Various aspects of the program 20 will be described in more detail below.

Figure 2A:
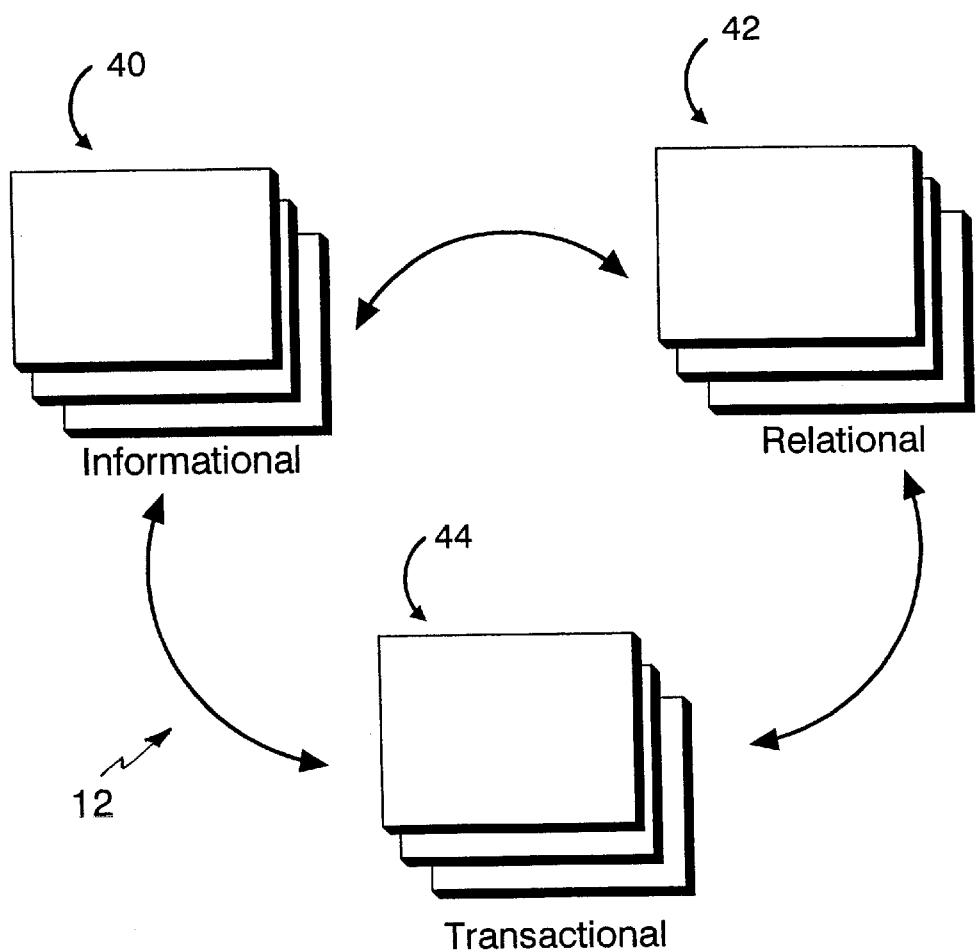
FIG. 2a is an illustration of the general structure of an information base.

Turning to FIG. 2a, there is shown the general structure of an Information base 12 according to the invention. Each information base is divided into a set of informational database tables 40, a set of relational tables 42, and preferably a set of transactional tables 44.

The informational tables 40 are used to store the actual data elements, the types of relationships which can exist between informational data elements, and the types of attributes which can be assigned to the relationships. The relational tables 42 are used to relate two or more items of information stored in the informational tables 40 and to store a value associated with a particular relationship between informational items or attribute of a data item. The transactional tables are used to maintain historical information about the transfer of values from one subject or relative to another, as occurs, for example, in connection with purchases or sales, assignments, timesheet processing, etc. Preferably, the various tables in the warehouse are assigned a unique number which is subsequently used to identify the table as required. Each of these areas will be discussed in detail below. The discussion of the preferred implementation of the different table sets will be followed by an example illustrating how data is stored in the tables.

Figure 2B:
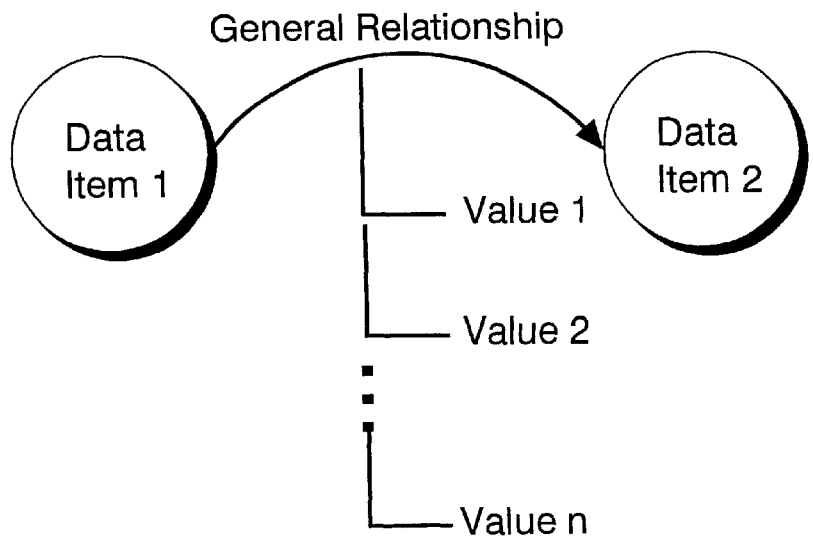
FIGS. 2b–2c are illustrations of relationship-based data valuation according to the invention.
Figure 2C:
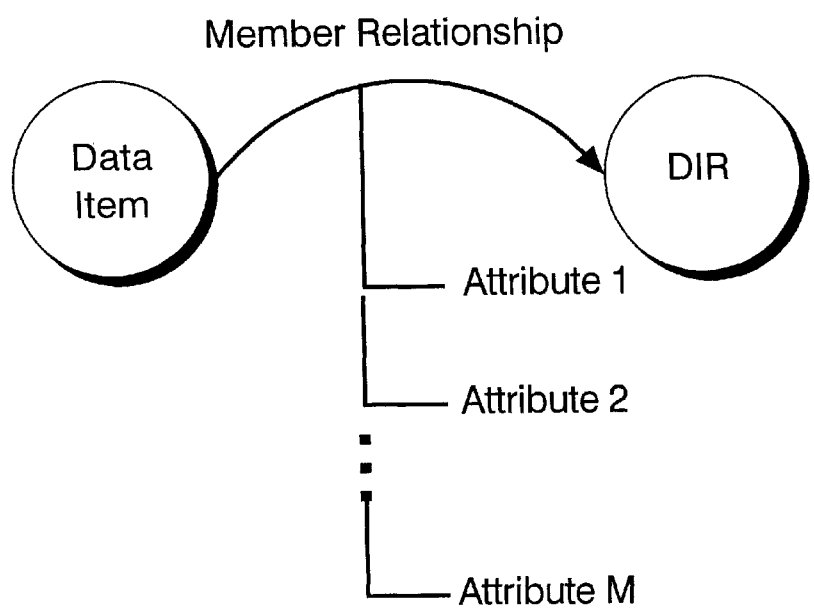

Turning to FIGS. 2b and 2c, there are shown graphical representations of relationship based data valuation according to the invention. According to the present invention, every data item has at least one relationship associated. Values and attributes are not associated attributed with a given data item. Instead, values and attributes are tied to the relationship. FIG. 2b illustrates two data items that are associated with each other by a general relationship. For example, an individual and a corporation can be related to each other by an employer relationship and the compensation associated with the employment stored as a value of the relationship.

Some values are more properly considered as an attributed of a single data item instead of a value that can be attributed to a relationship between two data items. According to the invention, every data item is provided with a default relationship to a directory data item, DIR, where the relationship simply indicates that the data item is a member of the database. This membership relationship is illustrated in FIG. 2c. It can be appreciated that every data item in the information warehouse will be related to DIR. Attribute values for a data item, for example an individual's social security number, are associated with the DIR relationship. Although this type of relational data value and attribute storage does require some additional data storage, thus appearing to decrease data storage density, this is outweighed by the increased data and value storage flexibility as well as increased flexibility and speed in searching for data in the information warehouse.

The set of informational, relational, and transactional tables utilized in the preferred embodiment of the invention will now be discussed.

INFORMATIONAL TABLES

According to the invention, the set of informational tables 40 has two major sections: a data set 45 of one or more tables for storing actual items of data and the DIR data item and a definition set 46 of one or more tables for storing the defined types of relationships between data elements and attributes attributable to relationships of data elements.

The tables in the data set 45 are configured to represent the particular data attributes which are typically found in conventional organizationally related information. Although all types of information could be stored in a single table, preferably, separate tables are provided for each category of informational elements. By segregating informational elements by category, each particular informational table can be optimized to contain only the data which is necessary to fully catagorize the particular category of data element, thus eliminating unnecessary redundancy between tables.

Figure 3:
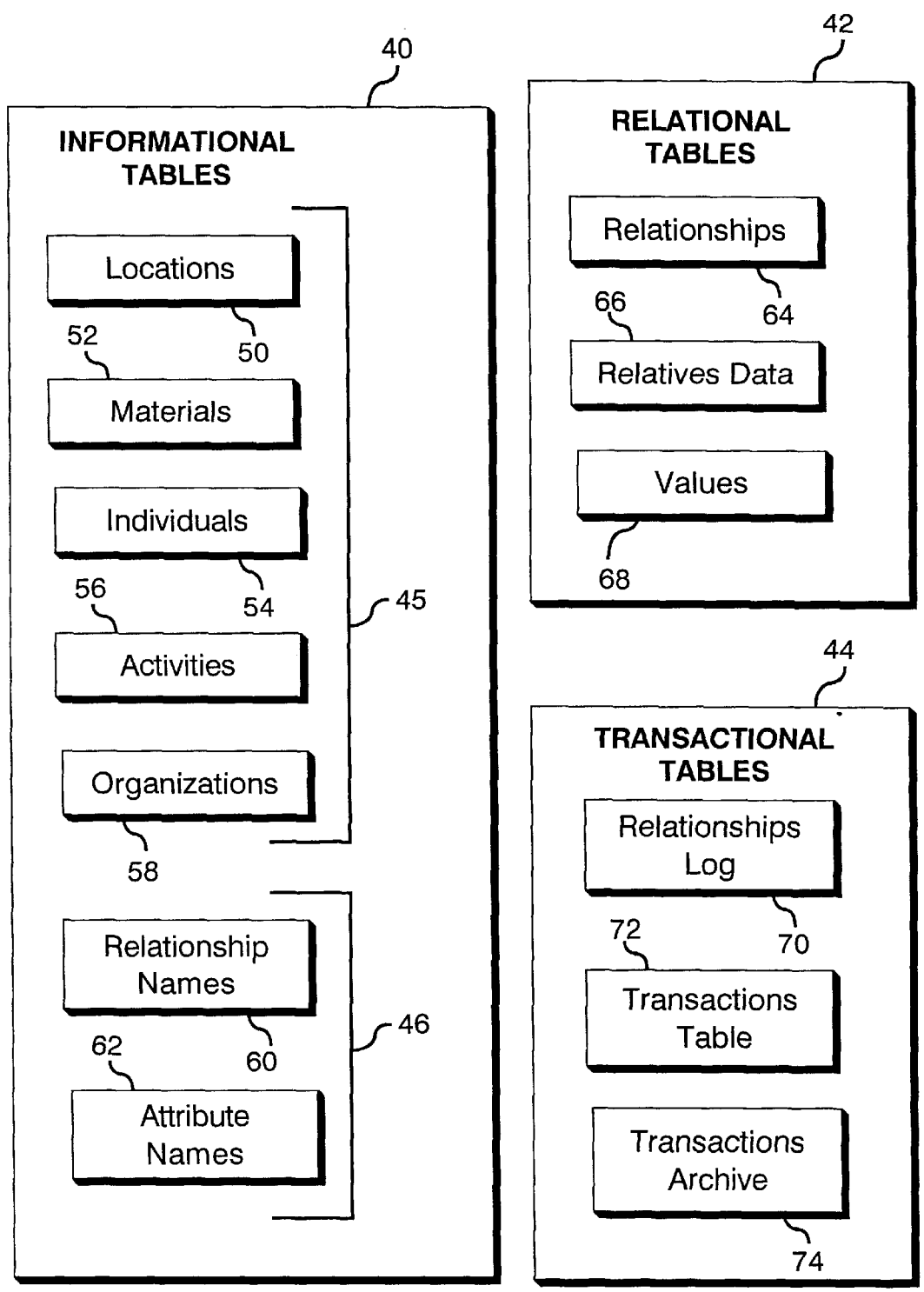
FIG. 3 is an illustration of a particular set of database tables for used in the information base of FIG. 2.

In a particularly preferred implementation illustrated in FIG. 3, the data set 45 is comprised of five separate tables: Locations 50, Materials 52, Individuals 54, Activities 56, and Organizations 58. The Individuals table 54 contains records used to uniquely identify individuals, i.e., by name. The Materials table 52 contains records which uniquely. identify material items, things, objects, etc. Preferably, the Materials table 52 is also used to store the DIR object, which is the target of the default relationships. The Locations table 54 contains records which uniquely identify locations, such as addresses. The Activities table 56 contains records that uniquely identify activities, i.e., projects, jobs, etc. The Organizations table 58 is used to identify the organizations of relevance, such as departments, divisions, etc.

The tables in the definition set 46 are used to store defined types of relationships and attributes which are used in conjunction with the data stored in the tables of the data set 45. In the preferred embodiment, these two types of definitions are stored in separate tables. A Relationship Names table 60 is used to store the names and general properties of relationships used to associate one data entry in an informational table with another data entry in an informational table. An Attribute Names table 62 is used to store the names of various attributes which can be applied to a given relationship.

Each of the seven informational tables 50–62 is essentially a specialized database for storing a particular type of information and each contains up to three general types of data fields—fields which are unique to the particular table, fields are common across various tables but which are used somewhat differently according to context (i.e., homonyms), and fields which appear in each table and which used to integrate a particular table with the rest of the information base 12. The underlying structure in which the tables 50–62 are implemented is not critical and is dependent on the overall computing environment for the Information Warehouse 10 as well as factors such as ease of data conversion from legacy database systems, etc. In a preferred embodiment, the tables 50–62 are implemented using conventional relational database structures. However, other database techniques, such as object oriented database structures, and pointer-based linked linked data configurations can be used instead, as will be apparent to one of skill in the art.

The preferred fields for each of the seven informational tables 50–62 are summarized in FIG. 4. Each table includes an identifier field ID which contains a value that uniquely identifies each record within the table. The ID is used for reference purposes to identify particular records in each of the tables. In addition, each table may also contain a resource identifier field RID which is unique identifier across the entire system. Such a global RID field generally is used for bookkeeping purposes by the underlying database support environment and is generally transparent to the users, system administrators, and developers.

In addition to one or more record identifier fields, each informational table includes a NAME field and possibly a DESCRIPTION field. The NAME field is a text field used to generally describe the particular data item, such as the name of an individual, a type of predefined relationship, such as "employee", or a type of predefined attribute, such as "Social Security Number." The DESCRIPTION field is used to store a more detailed description of the data item. Preferably, for historical tracking functions, each table also includes an UPDATED BY field for storing the identity of the user who last updated the record and an AUTHORIZED BY field for storing the identity of individual who authorized the last update.

For the tables in the data set 45, the remaining fields are also essentially the same, differing only according to context. In the preferred embodiment, each of the data set tables includes the following generalized fields:

LinkID: A numerical field used to identify a record within the same table of which this data item is a subset or element, or on a lower hierarchical level. For example, if a record in the table contains the location "Florida", a the LinkID for a Location entry of "Miami" would point to the "Florida" record. A condition where the LinkID points to itself or no data is stored in the LinkID indicates that there is no higher hierarchical entry in the table, in which case this record is of the highest hierarchical order in this table (or simply that the users are unconcerned with the hierarchical placement of this entry).

DOB: This is a date field used to store a relevant date according to context, such as the origination data of the data item, the birthday of an Individual, the manufacturing date of an item of material, the date of incorporation of an organization, etc.

POB: This is a record identifier used to store a relevant address according to context, such as the address or location of the place where the data item originated, a person was born, etc.

ORIGINATOR: This is a record identifier which identifies the originator of the data item, i.e. a parent of an individual, manufacturer of a material, etc.

BUILDER: This is a record identifier which identifies a party responsible for the identified data item, i.e., supervisor of an activity or organization, superintendent of a location, etc.

IDENTIFIER: This is a text field used to store commonly known identifiers which may be relevant to the particular data items, such as a serial number or zip code.

NOTE: This is a memo field for storing remarks about the data item.

In a particular implementation, of a data warehouse, the various fields discussed above can be renamed or "aliased" to provide a more meaningful description for the user. Advantageously, each of the data set tables 45 has the same basic structure making system setup and customization, searching, data conversions, etc., relatively simple.

Unlike the tables of the data set 45, the remaining preferred fields in the definition set tables 46 are relatively distinct. In addition to the ID, NAME, and DESCRIPTION fields discussed above, the Relationship Names table 60 contains a RELATIVES_TABLE_ID field. This field is an identifier that is used to indicate the particular informational table which contains the type of relatives the particular defined relationship applies to. For example, a relationship entry of "employer" would contain a Relatives_Table_ID indicating that the subject of the relationship entry is an entry in the Organizations table 58. Likewise, a relationship entry of "employee" would contain a Relatives_Table_ID indicating that the object of the relationship entry is an entry in the Individuals table 54.

The Attribute Names table 62 is contains a list of the defined attributes. A Per_UOM field which is used to identify the time unit of measure for the associated attribute, if appropriate, such as "per week" or "semi-annually." There is also an ATTRIBUTE_TYPE field, which is used to store the type of data associated with the attribute, such as numeric, date, alphanumeric, etc.

It will be recognized that for a particular application, not all tables may need to be implemented and not all fields will be useful in a particular situation. For example, in its simplest form, the tables in the data set 45 can be implemented using only the ID, RID, and NAME fields, or using all but the historically related fields, such as UPDATED BY and AUTHORIZED BY. Additional data fields may also be added to the various tables as required. Advantageously however, the full set of fields implemented in the preferred embodiment has been discovered to provide a high degree of flexibility in a large number of common business applications without resulting in a significant number of unused fields being present in the application.

In an alternative embodiment, rather than having separate tables, as defined above, the tables of the data set 45 can be combined within a single data table that includes an additional field identifying the particular context of the record, i.e., individual, material, location, etc. However, it is preferable to implement each classification of data to be stored in the data warehouse as a separate table in the data set 45 in order to reduce the total size of each table and the number of fields in each, thereby increasing the speed with which a given table can be processed. Of course if a particular context of data is irrelevant to a given data application, that context need not be implemented. Furthermore, should new contexts be desired, additional. tables can be added to the data set 45 using the same general structure described above.

As discussed above, because each data item to be stored in the system must have some relationship, a default data item entry and relationship is provided in one of the informational tables to which data items are related by default, separately from any "customized" relationships between two data items generally. This default entry is preferably a Directory entry, DIR, placed in the Materials table 45. DIR is an abstract object that represents the information warehouse itself and is the subject of default relationships used to indicate that other data items are in the Directory. Thus, when a new data item is entered, it will be related to the default DIR entry using the default "is in" relationship. Of course, other relationships can be added as well. It is apparent that a search for all data items which are related to DIR will return a list of every data item in the various tables.

RELATIONAL TABLES

According to the invention, relationships between data items are stored separately from the data items themselves to allow for the assignment and processing of data values attributed to the relationship itself, separate from the related data items. The particular relationships between data items stored in the informational tables, values attributed to those relationships, and values of the attributes of data items are stored in a group of tables conceptualized as Relational Tables 42. Advantageously, allowing the relationship to be separately valued provides an additional dimension of flexibility to the data warehouse with respect to both data entry and data searching.

A relationship can be defined according to five unique characteristics: (1) the type of relationship, (2), the object of the relationship, i.e., the relatee, (3) the element type of the relatee, i.e., which informational table is used to store the relatee, (4), the subject of the relationship, i.e., the relative, and (5) the element type of the relative, i.e., which informational table is used to store the relative. These relationship characteristics are preferably stored in two relational tables, entitled Relationships 64 and Relatives Data 66 (See FIG. 3). The preferred fields for each record in these data tables are summarized in FIG. 5.

Each entry in the Relationships table 64 contains fields for expressly storing the first three of these characteristics: RELATIONSHIP_TYPE, which identifies a particular entry in the Relationship Names table 60, a RELATEE_TYPE field which indicates the type of relatee for this relationship by identifying one of the informational tables, and a RELATEE_ID field, which identifies a particular record within the identified relatee table. Inherently, once the name of the relationship is identified, the type of the relative, i.e., the informational table the relative is stored in, can be easily determined 5 by referencing the definition of the identified relationship type in the Relationship Names table 60.

The Relatives Data table 66 is uses to store the final characteristic, the identity of the relative. In addition to the standard ID and RID fields, the Relatives Data table 66 contains two unique fields: RELATIONSHIP_ID and RELATIVE_ID. The RELATIONSHIP_ID field is used to tie entries in the Relatives Data table 66 to entries in the Relationships table 64 by identifying the record ID of the relationship in the Relationships Table 64 that is at issue. The RELATIVE_ID contains the ID of the record of the relative in the informational table inherently identified by the name of the relationship present in the Relationships Table 64. In other words, the object of the relationship.

Finally, according to an additional aspect of the invention, a Values table 68 is provided to store actual values associated with the attributes assigned to a given relationship. As in the other tables, the Values table 68 contains identity fields RID and ID. A VALUE fields is used to store a particular value, such as a number, address, etc. If necessary, the data type of the information stored in the VALUE field is identified in a VALUE_TYPE field. In addition, two complementary fields, ATTRIBUTE_NAME_ID and RELATIVE_ID, are used, respectively, to link a record in the values table between a particular entry in the Attribute Names table 62, to thereby identify the type of value, and a relationship entry in the Relatives Data table 66, to identify the relationship having the value table relationship.

Although a single table could be used to store all the characteristics of a given relationship, the preferred implementation advantageously increases system performance by limiting the number of records in each table and by ensuring that the field type most likely to be searched, the RELATIVE_ID, is in a table with a minimum number of field types.

DATA ENTRY INTERFACE AND SUPPORTING FUNCTIONS

The Data entry module consists of various user interfaces or screens configured consistent with the seven informational tables. The screens list the fields of each of the seven tables and contain corresponding areas for user input. Datatype restrictions may be implemented as needed. Preferably, data for fields into which only a limited number of entries is likely is entered via "combo boxes" which display a list of choices from which the user can select the desired input value. If the desired choice does not exist in the systems' list and the user has the appropriate authority, the user is preferably given the option to add the desired item to the list for subsequent use, thereby guaranteeing that the desired selection will always exist.

Preferably, for each of the seven Informational tables there is a corresponding data entry interfaces through which appropriately authorized users can Add new items, Modify existing items or Delete existing items. As data is entered through each of these interfaces, the data in the Relational and Transactional tables associated with the Informational table is updated appropriately. It is understood that the format and configuration of the data entry interface to the information warehouse may be designed as needed according to user preferences, the computing environment, etc.

EXAMPLE DIRECTORY DATABASE APPLICATION

In a particularly preferred embodiment, the information warehouse is specifically configured for use as a telephone or other type of informational directory. Because of the novel method of storing data and relationships used in the information warehouse, the directory can be searched along many different dimensions in an efficient manner. In particular, for the majority of data retrieval requests from such a directory, the majority of the searching is limited to the Relationships table 64 and the Relatives Data table 66. Once the proper relationship is identified, the identities of tables and particular record IDs of data associated with the relationship are easily obtained and the data can therefore be quickly extracted from the identified tables.

Turning to FIGS. 7a–7c there are shown sample, partially populated tables of FIGS. 4 and 5 particularly configured for use as a telephone directory. Tables 1–7 correspond to the seven informational tables and tables 8–10 correspond to the three relational tables. The directory listing contains commonly required information, such as names, mailing addresses, telephone numbers, e-mail addresses, organizational relationships, etc. Because of relationship-based valuation utilized, along with the particular linking between data items generally described above, an Information Warehouse according to the invention is particularly well suited for flexibly storing directory information and for retrieving such information with a great degree of flexibility.

In the sample tables, sufficient data is included to illustrate various aspects of the database. However, elements have been omitted for clarity. In particular, non-essential fields, such as "Updated By" and the unique system RID, are not shown and only a portion of the default DIR relationships have been illustrated. It should be recognized that, in practice, the various data fields can be "aliased" or renamed as part of a customization process so that the field names more clearly indicate the specific type of data to be stored.

Each of the tables will now be discussed in turn. Those of skill in the art will recognize that since the various tables are generally separate, they can be populated on an as-needed basis. Similarly, new relationship names, attribute names, etc., can be defined as required. Preferably, common relationship names and attribute names are predefined during a customization process. In addition, the DIR data object is defined to serve as a target for the (default) membership relationship.

Table 1 is an illustration of the Locations_Table 50. Each location contains a table-unique ID, a location name, a more detailed description, and a LinkID. The link ID is used to establish hierarchical relationships between elements. In addition, the Note and Identifier fields are aliased to provide storage for a building number and a ZIP code. For example, record 13 identifies the location of Apartment 1A on the 11th floor of building number 71, zip code 10006. The LinkID of 11 indicates that this record is subordinate to record 11, which indicates that the building is on Broadway. Continuing to follow the LinkIDs indicates that Broadway is in New York City (record 6), which is in New York State (record 4), which is in the United States (record 1). The LinkID for record 1 is 1, which indicates that this is the highest level in the hierarchy. Alternatively, the LinkID for the highest hierarchical level can be omitted.

It can be appreciated that in other types of database representations, similar hierarchical relationships can be represented in the form of a linked tree of data nodes. However, the "flat" record format illustrated in the figure aids in retrieving information because a record can be immediately accessed if the record ID is known and the "tree" only needs to be traversed if hierarchical information is needed.

Table 2 is the Materials Table 52 and is used to store data items representing various things, parts, etc. In the preferred embodiment, this table is used to store the DIR data item, which represents the Information Warehouse itself. In this example, the additional entries in the Materials Table identify various types of data and entertainment access channels.

Table 3 is the Individuals Table 54 and contains records for each individual stored in the directory. In this example, there are 7 individuals. In this example, the "Description" field is used to store the individual's last name. Of course, other arrangements are possible and the field names can be aliased as needed, i.e., the Name field can be aliased to "First Name" and the Description field aliased to "Last Name." Hierarchical relationships can also be used to define family relationships, primary business contacts, etc., such as shown in records 4–7, all of which are linked to record 3.

Table 4 is the Activities table 56 and is used to store various activities of interest. Table 5 is the Organizations table 58 and is used to identify various organizations of interest. It can be appreciated that the entries in Tables 2, 4, and 5 correspond generally to the subject headings in conventional "Yellow Pages" telephone directories.

Table 6 is the Attribute Names table 62 and contains the identity of various attributes that can be tied to a given relationship. A small sample of possible attributes are illustrated. In a particular implementation, certain common attributes can be predefined during a customization.

Table 7 is the Relationship Names table 60 and contains the definition for the various possible relationships. between data items. The Relatives_Table_ID field contains the table number that contains the type of data item which is the subject of the relationship. For example, record 1 defines the relationship "Address" and is directed to table 1, i.e., the Locations Table. Similarly, record 2 defines the relationship "occupation" and is directed to table 4, i.e., the Activities Table.

Table 8 is the Relationships Table 64 and is used to define an "is a" or "has a" type of relationship without defining the subject, i.e, a relationship of the form <subject> is a <relationship-type> of <object>. For example, record 2 defines a relationship type of 4, which identifies the record in the Relationship Names Table that generally defines this type of relationship. With reference to record 4 in the Relationship Names Table in FIG. 7b, this relationship is an "employee" relationship with a subject that is drawn from table 3, i.e, the Individuals table. The Relatee Type and Relatee ID identify the object of the relationship, here record 1 in table 5, which is the Darby organization. Thus, record 1 defines the generic relationship "<individual> is an employee of Darby." Similarly, record 7 defines the relationship "<organization> is based in New York." Record 8 is an example of a membership relationship to the DIR entry, defining the relationship "<individual> is a person in DIR."

Table 9 is the Relatives Data Table 66, which identifies the subject that is omitted in the relationships defined in the Relationships Table, above. Each record simply identifies a particular relationship record in the Relationships Table and provides the missing record number for the identified subject table. For example, record 1 in the Relatives Data table refers to Relationships Table record 2. As discussed above, record 2 is the relationship <individual> is an employee of Darby. The Relative_ID of 1 signifies that the particular related individual is record 1 from the individuals table, i.e., Mitch Martin. Thus, the complete relationship is Mitch Martin is an employee of Darby.

In further accordance with the invention, values can be attributed to each of the data item relationships. Table 10 is an illustration of a particular Values table 68. The Attrib_Name_ID field identifies a particular attribute record from the Attribute Names Table 62 and the Relative_ID field ties that attribute to a particular record in the Relatives Data table. Value and Value_Type specify the value assigned to the attribute.

For example, record 1 of this table links the attribute "E-mail address" (Attribute Names Table record 3) to relationship 11, which is the "Mitch is a person in DIR" relationship, and assigns it a value of "mm@abc.com". Because this value is attributed-to the default DIR relationship, it can be considered an attribute of the data item "Mitch Martin" which-will remain the same in various contexts. In contrast, record 2 in the Values Table ties the attribute "E-mail address" and value "mitch@work.com" to an employee relationship, "Mitch. Martin is an employee of Darby." This is a relationship based value because the assigned e-mail address is only valid in the context of the relationship between Mitch Martin and the employer Darby. Other e-mail addresses may be attributed to Mitch Martin in other contexts.

As another example, record 3 of the Values Table identifies attribute 8, i.e., whether a business is open on weekends. This entry references Relatives Data Table record 9 and indicates that the KC organization which is based in New York is open on the weekend.

According to the invention, dividing the relationship definition into two separate tables as described above greatly simplifies searching and retrieving various data elements from the directory because the members of generic relationships can be quickly extracted from the Relatives Data table by keying the search to the appropriate Relationship ID number. As discussed above, record 7 in the Relationships table defines the generic relationship "<organization> is based in New York." Simply filtering the Relative Data Table to identify records with a Relationship ID of 7, here records 7–10, inherently identifies all organizations in the database which are identified as being based in New York. Similarly, filtering all records with a Relationship ID of 8 will retrieve the names of all people stored in the database, i.e, every <individual> who is a person in DIR.

In a particular implementation of an Information Warehouse as described above, the general database process consists of three basic parts. First, the range or scope of the search is narrowed through the selection of Relatee of the Parent Category and the specific parent. This could be a specific Location, or a certain object, a specific person, a particular activity, an organization, a particular type of Classification (Relationship Name or a specific Attribute). For Example a user can narrow the search to a Location of NY City.

Second, the type of list (Relationship Name) to search is selection or a Classification of the a within a selected group is identified. For example, once NY City is selected, all the Located In Relationships which exist in the Database for NY City will be listed and the user is prompted to select one or more of the listed relationships. In the example, this list of Relationships is essentially a geographically based filter of the various entries, i.e., a New-York guide book, and, for example, may contain various Restaurants, Theaters, Cinemas, Brokerage houses, Banks, Bonds Issued, special events to take place in NYC, etc. etc., as defined within the Information Warehouse. Finally, to further narrow the search, one relationship, for example Restaurants, is selected. A list of all items which satisfy these conditions are then displayed.

Those of skill in the art will appreciate that the particular distribution of informational and factual data in the information base tables, as discussed above, greatly simplifies searches of the type discussed above because, at each stage, only a narrow portion of the database must be searched and the search parameters are also relatively focused. An additional technique, switching, can be used to further narrow the search. Once a list has been found and a specific item on that list selected by the user, information from the selected item is used as the scope of the search in step one, above, and the search proceeds through steps two and three as described above.

TRANSACTIONAL TABLES

As an addition to the preferred embodiment, a set of transactional tables is provided for use in tracking changes to the informational and relational tables, transfers of values from one subject to another, and to maintain a historical archive of transactions which are no longer relevant to current activities. In the preferred embodiment, and with reference to FIG. 6, three transactional tables are provided: a Transactions Table 72 for storing information related to the transfer of values from one relative to another, a Relationships Log 70 for maintaining a record of changes to the Informational tables 40 and Relational tables 42, and a Transactions Archive table 74 for maintaining a history of various transactions.

Figure 8A:
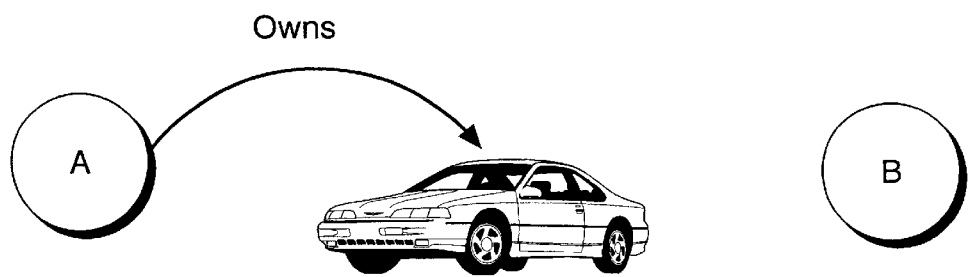
FIGS. 8a and 8b illustrate a transaction resulting in the exchange of a relationship from one pair of data items to another.
Figure 8B:
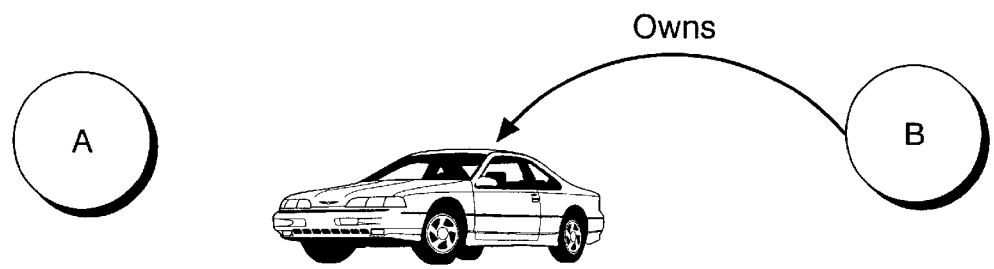

As used in the present invention, a transaction is the exchange of a relationship from one pair of data items to another. For example, FIGS. 8a and 8b illustrate three data items, individuals A and B, and a material object Car. In FIG. 8a, the relationship "owns" is used to indicate that A owns the car. FIG. 8b illustrates the relationship after A sells the car to B. The Transactions table is used to keep track of changes in relationships to an object, such as the car, and to store one or more values associated with the change in relationship, such as the price of the car.

A sample Transactions Table 72 is illustrated in FIG. 6. The table includes the standard ID and/or RID fields. A RELATIVE field is used to store information necessary to identify the particular object of the transaction, a car in this example. A RELATIONSHIP field is used to identify the relationship which has changed, such as by reference to the Relationship Names table. In addition, the FROM_RELATEE and TO_RELATEE fields are used to store information that identifies the initial and final subjects of the relationship, i.e., individual A and individual B, respectively, in the above example. Finally, a VALUE field is provided to store a value attributed to the change in relationship. Generally, this indicates the transaction cost. However, other values can also be attributed to the change in transaction.

Also shown in FIG. 6 are the remaining tables, the Relationships Log table 70 and the Transactions Archive 74. Together, these two tables are used to provide historical log and archive data about the prior state of the database. Various techniques for historical data logging and archiving old data are known to those of skill in the art and various fields can be implemented in these tables to accomplish this task.

While the invention has been particularly shown and described with reference to preferred embodiments thereof, it will be understood by those skilled in the art that various changes in form and details may be made therein without departing from the spirit and scope of the invention.

I claim:

1. An information warehouse including a plurality of computer databases stored in a computer readable medium, said computer readable medium comprising:
   a plurality of informational tables configured to store informational elements including a default object; and
   a plurality of relational tables configured to store relationship links between pairs of informational elements stored in the informational tables, including a relationship link to said default object from each informational element in said informational tables, to associate attributes to particular relational links, and to store values for said attributes.

2. The information warehouse of claim 1, further comprising a plurality of transactional tables configured to store data related to changes made to said informational and relational tables.

3. The information warehouse of claim 1, wherein each said informational table is configured to store data as a plurality of records comprising:
   an ID field for storing a value uniquely identifying that respective record in a particular informational table; and
   a NAME field for storing a general description of each record in said informational table.

4. The information warehouse of claim 3, wherein said informational tables comprise:
   at least one data table for storing said informational elements; and
   at least one definitional table for storing relationship and attribute definitions.

5. The information warehouse of claim 4, wherein each record in said data table further comprises a DESCRIPTION field for storing data augmenting the general description of each informational element stored in the name field.

6. The informational warehouse of claim 4, wherein each record in said data table further comprises a LinkID field for storing a data value to hierarchically associate a first record in said data table with a second record in said data table.

7. The informational warehouse of claim 4, wherein each record in said data table further comprises a DOB field for storing data indicating a date of origination of each information element stored in said data table.

8. The informational warehouse of claim 4, wherein each record in said data table further comprises a POB field for storing data indicating an origination location of each information element stored in said data table.

9. The informational warehouse of claim 4, wherein each record in said data table further comprises an ORIGINATOR field for storing data indicating an originator of each information element stored in said data table.

10. The informational warehouse of claim 4, wherein each record in said data table further comprises a BUILDER field for storing data identifying a party responsible for each information element stored in said data table.

11. The informational warehouse of claim 4, wherein each record in said data table further comprises an IDENTIFIER field for storing identification information associated with each information element stored in said data table.

12. The informational warehouse of claim 4, wherein each record in said data table further comprises a NOTE field for storing remarks associated with each information element stored in said data table.

13. The information warehouse of claim 4, wherein said at least one definitional table comprises:
   a Relationship Names table configured to store relationship definitions, data stored in the NAME field for a record in said Relationship Names table representing a defined relationship type; and
   each record in said Relationship Names table further comprising a RELATIVES_TABLE_ID field for storing data identifying a particular data table to which the defined relationship type refers.

14. The information warehouse of claim 13, wherein said plurality of relational tables are configured to store data as a plurality of records, each record comprising an ID field for storing a value uniquely identifying that respective record in a particular relational table;
   said relational tables comprising a Relationship table and a Relatives_Data table, each record in said Relationship table further comprising:
      a RELATIONSHIP_TYPE field for storing data identifying a particular record in the Relationship Names table to thereby identify a particular relationship type;
      a RELATEE_TYPE field for storing data identifying a particular data table from the at least one data table; and
      a RELATEE_ID field for storing data identifying a particular record in the particular data table identified by the data in the RELATEE_TYPE field, data stored in said RELATEE_TYPE and RELATEE_ID fields thereby identifying a first informational element, which first informational element is the object of the identified particular relationship type;
   each record in said Relatives_Data table further comprising:
      a RELATIONSHIP_ID field for storing data identifying a particular record in the Relationship Table; and
      a RELATIVES_ID field for storing data identifying a particular record in the particular data table identified by data in the RELATIVES_TABLE_ID field of the particular record in the Relationship Names table identified by data in the RELATIONSHIP_TYPE field, thereby identifying a second informational element, which second informational element is the subject of the identified particular relationship type, a relationship defined by said subject, identified particular relationship type relationship, and object.

15. The information warehouse of claim 14, wherein said relational tables further comprise a Values table, each record in said Values table further comprising:
   a RELATIVE_ID field for storing data identifying a particular record in the Relatives Data table, and thereby identifying a particular relationship; and
   a VALUE field for storing a value associated with the identified particular relationship.

16. The information warehouse of claim 15, wherein said at least one definitional table further comprises an Attribute Names table configured to store attribute definitions, data stored in the NAME element for a record in said Attribute Names table representing a defined attribute type; and
   each record in said Values table further comprising an ATTRIBUTE_NAME_ID field for storing data identifying a particular record in the Attribute Names table to thereby identify a particular attribute type.

17. The information warehouse of claim 14, further comprising a Transactions table configured to store data related to transactional changes made to said relational tables.

18. The information warehouse of claim 17, wherein said Transactions table is configured to store data as a plurality of records comprising:
- an ID field for storing a value uniquely identifying that respective record in the Transactions table;
- a RELATIVE field for storing data to identify an object of a transaction;
- a RELATIONSHIP field for storing data to identify the relationship which has changed;
- a FROM_RELATEE field for storing data identifying the initial subject of the identified relationship; and
- a TO RELATEE field for storing data identifying the final subject of the identified relationship.

19. The information warehouse of claim 18, wherein each record in said Transactions table further comprises a VALUE field to store data indicating a value attributed to a transactional change identified by data stored in said RELATIVE, RELATIONSHIP, FROM_RELATEE, and TO_RELATEE fields.

20. The information warehouse of claim 4, wherein said at least one data table comprises a plurality of data tables, each said data table being assigned to store a distinct category of informational elements.

21. The information warehouse of claim 20, wherein said distinct categories of informational elements are selected from a group of categories consisting of individuals, materials, locations, activities, and organizations.

22. The information warehouse of claim 21, wherein said plurality of data tables comprise five data tables assigned to store informational elements from the category of individuals, materials, locations, activities, and organizations, respectively.

23. The information warehouse of claim 3, wherein said at least one definitional table comprises:
- a Relationship Names table configured to store relationship definitions; and
- an Attribute Names table configured to store attribute definitions.

24. The information warehouse of claim 23, wherein data stored in the NAME field for a record in said Relationship Names table represents a defined relationship type; and
- each record in said Relationship Names table further comprising a RELATIVES_TABLE_ID field for storing data identifying a particular informational table to which the defined relationship name refers.

25. The information warehouse of claim 24, wherein each record in the Relationship Names table further comprises a DESCRIPTION field for storing data augmenting the general description of each informational element stored in the name field.

26. The information warehouse of claim 23, wherein data stored in the NAME field for a record in said Attribute Names table represents a defined attribute type.

27. The informational warehouse of claim 26, wherein each. record in the Attribute Names table further comprises a Per_UOM field for storing data identifying a time unit of measure associated with a defined attribute type represented by the NAME field of the respective Attribute Names table record.

28. An informational directory including a plurality of computer database tables stored in a computer readable medium, each said table configured to store data as a plurality of records, each record having an ID field for storing a value uniquely identifying that respective record in a particular informational table, said computer readable medium comprising:
- a plurality of informational tables configured to store informational elements including a default object; and
- a plurality of relational tables configured to store relationship links between pairs of informational elements stored in the informational tables, including a relationship link to said default object from each informational element in said informational tables, to associate attributes to particular relational links, and to store values for said attributes.

29. The information warehouse of claim 28, wherein:
- each record in said informational table comprises a NAME field for storing a general description of each record in said informational table; and
- said informational tables comprising a plurality of data tables for storing said informational elements, each said data table assigned to store a distinct category of informational elements.

30. The informational warehouse of claim 29, wherein each record in said data table further comprises a LinkID field for storing a data value to hierarchically associate a first record in said data table with a second record in said data table.

31. The information warehouse of claim 29, wherein said informational tables further comprise:
- a Relationship Names table configured to store relationship definitions; and
- an Attribute Names table configured to store attribute definitions.

32. The information warehouse of claim 31, wherein:
- data stored in the NAME field for a record in said Attribute Names table represents a defined attribute type;
- data stored in the NAME field for a record in said Relationship Names table represents a defined relationship type; and
- each record in said Relationship Names table further comprising a RELATIVES_TABLE_ID field for storing data identifying a particular informational table to which the defined relationship name refers.

33. The information warehouse of claim 32, wherein said plurality of relational tables are configured to store data as a plurality of records, each record comprising an ID field for storing a value uniquely identifying that respective record in a particular relational table;
- said relational tables comprising a Relationship table and a Relatives_Data table, each record in said Relationship table further comprising:
  - a RELATIONSHIP_TYPE field for storing data identifying a particular record in the Relationship Names table to thereby identify a particular relationship type;
  - a RELATEE_TYPE field for storing data identifying a particular data table from the at least one data table; and
  - a RELATEE_ID field for storing data identifying a particular record in the particular data table identified by the data in the RELATEE_TYPE field, data stored in said RELATEE_TYPE and RELATEE_ID fields thereby identifying a first informational element, which first informational element is the object of the identified particular relationship type;
- each record in said Relatives_Data table further comprising:
  - a RELATIONSHIP_ID field for storing data identifying a particular record in the Relationship Table; and a RELATIVE_ID field for storing data identifying a particular record in the particular data table identified by data in the RELATIVES_TABLE_ID field of the particular record in the Relationship Names table identified by data in the RELATIONSHIP_TYPE field, thereby identifying a second informational element, which second informational element is the subject of the identified particular relationship type, a relationship defined by said subject, identified particular relationship type relationship, and object.

34. The information warehouse of claim 33, wherein said relational tables further comprise a Values table, each record in said Values table further comprising:
   a RELATIVE_ID field for storing data identifying a particular record in the Relatives Data table, and thereby identifying a particular relationship;
   a VALUE field for storing a value associated with the identified particular relationship; and
   an ATTRIBUTE_NAME_ID field for storing data identifying a particular record in the Attribute Names table to thereby identify a particular attribute type.

35. The information warehouse of claim 34, wherein said distinct categories of informational elements are selected from a group of categories consisting of individuals, materials, locations, activities, and organizations.

36. The information warehouse of claim 35, wherein said plurality of data tables comprise five data tables assigned to store informational elements from the category of individuals, materials, locations, activities, and organizations, respectively.

37. A method of storing data in an informational directory including at least one informational table configured to store informational elements including a default object and at least one relational table configured to store relationship links between pairs of informational elements stored in the informational tables, the method comprising the steps of:
   storing data representing at least one informational element in at least one informational table; and
   storing data representing a default relationship link between each informational element and the default object in one or more of the at least one relational tables.

38. The method of claim 37, further comprising the steps of:
   storing data associating an attribute and attribute value to the default relationship link between a particular informational element and the default object in one or more of the at least one relational tables.

39. The method of claim 37, further comprising the step of:
   storing data representing a custom relationship link between a first informational element and a second informational element in one or more of the at least one relational tables.

40. The method of claim 39, further comprising the step of:
   storing data associating an attribute and attribute value to the custom relationship link between the first and second informational elements in one or more of the at least one relational tables.

41. The method of claim 40, wherein the step of storing data representing a custom relationship link comprises the steps of:
   storing a record in a Relationship table including RELATIONSHIP_TYPE information identifying a particular relationship type, RELATEE_TYPE information identifying a particular informational table containing the second informational element, and RELATEE_ID information identifying a particular record in the particular data table identified by the RELATEE_TYPE information; and
   storing a record in a Relatives_Data table including RELATIONSHIP_ID information identifying a particular record in the Relationship table and RELATIVE_ID information Identifying the first informational element.

42. The method of claim 41, further comprising the step of:
   storing in a record in a Relationship Names table NAME information identifying a defined relationship type, and RELATIVES_TABLE_ID information identifying a particular informational table to which the defined relationship type refers;
   wherein said RELATIONSHIP_TYPE information identifies a particular record in the Relationship Names table, and the RELATIVE_ID information identifies a particular record in the informational table identified by the RELATIVES_TABLE_ID information of the particular record in the Relationship Names table identified by the RELATIONSHIP_TYPE information.

43. The method of claim 42, wherein:
   said informational tables comprise a plurality of informational tables each assigned to store a distinct category of informational elements selected from a plurality of distinct categories;
   each of said at least one informational elements falls within one of said plurality of categories;
   data representing each particular informational element being stored in a corresponding informational table having a matching assigned distinct category.

44. The method of claim 43, wherein said distinct categories are selected from a group of categories consisting of individuals, materials, locations, activities, and organizations.

45. The information warehouse of claim 44, wherein said plurality of data tables comprise five data tables assigned to store informational elements from the category of individuals, materials, locations, activities, and organizations, respectively.

46. An information warehouse including a plurality of computer databases stored in a computer readable medium, said computer readable medium comprising:
   a plurality of informational tables configured to store a plurality of informational elements and at least one default object, each of said informational tables being associated with a table identification (ID); and
   a plurality of relational tables configured to store a plurality of relationship links between a plurality of selected informational elements stored in the informational tables and said relationship links including a first relationship link to said table identification (ID) for at least one of said selected informational elements and a default relationship link between each of said informational elements and the default object in one of the informational tables.

47. The informational warehouse of claim 46 wherein said first relationship link is one of a RELATIONSHIP TYPE field and a RELATEE TYPE field of a Relationships Table.

48. The information warehouse of claim 46 further including at least one informational table comprising a plurality of subset informational tables, each said subset informational table being assigned to store a distinct category of informational elements.

49. The information warehouse of claim 48 wherein said distinct category includes one of individuals, materials, locations, activities, organizations, attributes and relationship names.

50. The information warehouse of claim 46 further including at least one informational table comprising a plurality of subset informational tables and each said subset informational tables being assigned to store a distinct category of informational elements, whereby said information table is assigned to store a plurality of distinct categories of informational elements.

51. The information warehouse of claim 50 wherein said plurality of distinct categories includes at least two of the group consisting of individuals, materials, locations, activities, and organizations.

52. The information warehouse of claim 50 wherein said plurality of distinct categories includes at least two of the group consisting of attributes and relationship names.

53. An informational directory including a plurality of computer database tables stored in a computer readable medium, each said table configured to store data as a plurality of records, each record having an ID field for storing a value uniquely identifying that respective record in a particular informational table, said computer readable medium comprising:
   a plurality of informational tables configured to store a plurality of informational elements and at least one default object, each of said informational tables being associated with a table identification (ID) and at least one of said informational tables including a table identification link to at least one table identification; and
   a plurality of relational tables configured to store a plurality of relationship links between a plurality of selected informational elements stored in the informational tables, said relationship links including a first relationship link to said table identification (ID) for at least one of said selected informational elements, a second relationship link to another of said selected informational elements based on at least said table identification link to said table identification and a default relationship link between each of said informational elements and the default object in one of the informational tables.

54. The information warehouse of claim 53, wherein the table identification (ID) is a table number, said first relationship link is the one of a RELATIONSHIP TYPE field and a RELATEE TYPE field of a Relationships Table and said second relationship link is a RELATIONSHIP_ID field of a Relatives Data Table.

55. The informational warehouse of claim 53 wherein said first relationship link is one of a RELATIONSHIP TYPE field and a RELATEE TYPE field of a Relationships Table.

56. The information warehouse of claim 53 further including at least one informational table comprising a plurality of subset informational tables, each said subset informational table being assigned to store a distinct category of informational elements.

57. The information warehouse of claim 53 further including at least one informational table comprising a plurality of subset informational tables and each said subset informational tables being assigned to store a distinct category of informational elements, whereby said information table is assigned to store a plurality of distinct categories of informational elements.

58. The information warehouse of claim 53 wherein said distinct category includes one of individuals, materials, locations, activities, organizations, attributes and relationship names.

59. The information warehouse of claim 53 wherein said plurality of distinct categories includes at least two of the group consisting of individuals, materials, locations, activities and organizations.

60. The information warehouse of claim 53 wherein said plurality of distinct categories includes at least two of the group consisting of attributes and relationship names.

* * * * *